US007591009B2

(12) United States Patent  (10) Patent No.: US 7,591,009 B2
Masuoka  (45) Date of Patent: *Sep. 15, 2009

(54) POLICY RULE MANAGEMENT SUPPORT METHOD AND POLICY RULE MANAGEMENT SUPPORT APPARATUS

(75) Inventor: Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 11/065,353

(22) Filed: Feb. 25, 2005

(65) Prior Publication Data
US 2006/0041928 A1 Feb. 23, 2006

(30) Foreign Application Priority Data
Aug. 17, 2004 (JP) ............................. 2004-237178

(51) Int. Cl.
G06F 9/00 (2006.01)
(52) U.S. Cl. .............................. 726/11; 726/12; 726/13; 726/14; 713/151; 713/152
(58) Field of Classification Search ................ None
See application file for complete search history.

(56) References Cited
U.S. PATENT DOCUMENTS
6,446,200 B1 * 9/2002 Ball et al. .................... 713/1
2005/0131937 A1 * 6/2005 Parkyn .................. 707/103 R

FOREIGN PATENT DOCUMENTS
JP   2001-257718   9/2001
JP   2003-85139    3/2003

\* cited by examiner

Primary Examiner—Pramila Parthasarathy
(74) Attorney, Agent, or Firm—Antonelli, Terry, Stout & Kraus, LLP.

(57) ABSTRACT

When a system configuration is changed, a policy rule that should be modified as a result of the configuration change is modified without fail.

A policy management apparatus 1 comprises a processing unit and a policy rule table 151 that stores at least one policy rule for each component of a computer system. For each component of the computer system, the processing unit performs a receiving step, in which a notification of a configuration change is received, a detection step, in which at least one component that is affected by the component configuration change received in the receiving step is detected, and a generation step, in which a policy rule corresponding to each of the components detected in the detection step is specified from the policy rule table 151 and a list of specified policy rules is generated.

10 Claims, 14 Drawing Sheets

FIG. 5

MANAGED OBJECT TABLE

231

| OBJECT NAME 501 | OBJECT TYPE 502 | DETAILED INFORMATION 503 |
|---|---|---|
| AP SERVER 4-1 | AP SERVER | CPU NAME = X |
| MIDDLEWARE 43-1 | MIDDLEWARE | PRODUCT NAME = Y, VERSION = 2 |
| WORK APPLICATION 42 | WORK APPLICATION | PROGRAM NAME = W |
| WORK A | WORK | WORK NAME = A |
| ⋮ | ⋮ | ⋮ |

FIG. 6

DEPENDENCY RELATION TABLE 232

| OBJECT NAME 601 | UPPER OBJECT NAME 602 |
|---|---|
| AP SERVER 4-1 | MIDDLEWARE 43-1 |
| MIDDLEWARE 43-1 | WORK APPLICATION 42 |
| WORK APPLICATION 42 | WORK A |
| WORK A | (SPACE) |
| ⋮ | ⋮ |

FIG. 7

OPERATION MANAGEMENT TABLE 233

| OBJECT NAME 701 | OPERATION NAME 702 | AGENT ADDRESS 703 | AGENT PORT NUMBER 704 |
|---|---|---|---|
| MIDDLEWARE 43-1 | ACTIVATION OF WORK | IP ADDRESS 1 | 20000 |
| ⋮ | ⋮ | ⋮ | ⋮ |

FIG. 8
POLICY RULE TABLE
151

| OBJECT NAME (801) | EVENT NAME (802) | SEQUENTIAL NUMBER (803) | OPERATION OBJECT NAME (804) | OPERATION NAME (805) | ARGUMENT (806) {810} |
|---|---|---|---|---|---|
| WORK A | RESPONSE TIME TOO LONG | 1 | MIDDLEWARE 43-2 | ACTIVATION OF WORK | PROGRAM NAME = W |
| WORK A | RESPONSE TIME TOO LONG | 2 | LOAD DISTRIBUTION APPARATUS 3 | ADDITION OF LOAD DISTRIBUTION DESTINATION | MIDDLEWARE 43-2 |
| ...... | ...... | ...... | ...... | ...... | ...... |
| AP SERVER 4-1 | FAILURE | 1 | LOAD DISTRIBUTION APPARATUS 3 | DELETION OF LOAD DISTRIBUTION DESTINATION | MIDDLEWARE 43-1 |
| AP SERVER 4-1 | FAILURE | 2 | MIDDLEWARE 43-2 | ACTIVATION OF WORK | PROGRAM NAME = W |
| AP SERVER 4-1 | FAILURE | 3 | LOAD DISTRIBUTION APPARATUS 3 | ADDITION OF LOAD DISTRIBUTION DESTINATION | MIDDLEWARE 43-2 |
| ...... | ...... | ...... | ...... | ...... | ...... |

FIG. 15

POLICY RULE TABLE 151A

| OBJECT NAME (801) | EVENT NAME (802) | SEQUENTIAL NUMBER (803) | OPERATION OBJECT NAME (804) | OPERATION NAME (805) | ARGUMENT (806) | CAUTION FLAG (807) |
|---|---|---|---|---|---|---|
| WORK A | RESPONSE TIME TOO LONG | 1 | MIDDLEWARE 43-2 | ACTIVATION OF WORK | PROGRAM NAME = W | 1 |
| WORK A | RESPONSE TIME TOO LONG | 2 | LOAD DISTRIBUTION APPARATUS 3 | ADDITION OF LOAD DISTRIBUTION DESTINATION | MIDDLEWARE 43-2 | 1 |
| ...... | ...... | ...... | ...... | ...... | ...... | |
| AP SERVER 4-1 | FAILURE | 1 | MIDDLEWARE 43-2 | DELETION OF LOAD DISTRIBUTION DESTINATION | MIDDLEWARE 43-1 | 0 |
| AP SERVER 4-1 | FAILURE | 2 | LOAD DISTRIBUTION APPARATUS 3 | ACTIVATION OF WORK | PROGRAM NAME = W | 0 |
| AP SERVER 4-1 | FAILURE | 3 | LOAD DISTRIBUTION APPARATUS 3 | ADDITION OF LOAD DISTRIBUTION DESTINATION | MIDDLEWARE 43-2 | 0 |
| ...... | ...... | ...... | ...... | ...... | ...... | |

(820 brackets ARGUMENT and CAUTION FLAG columns)

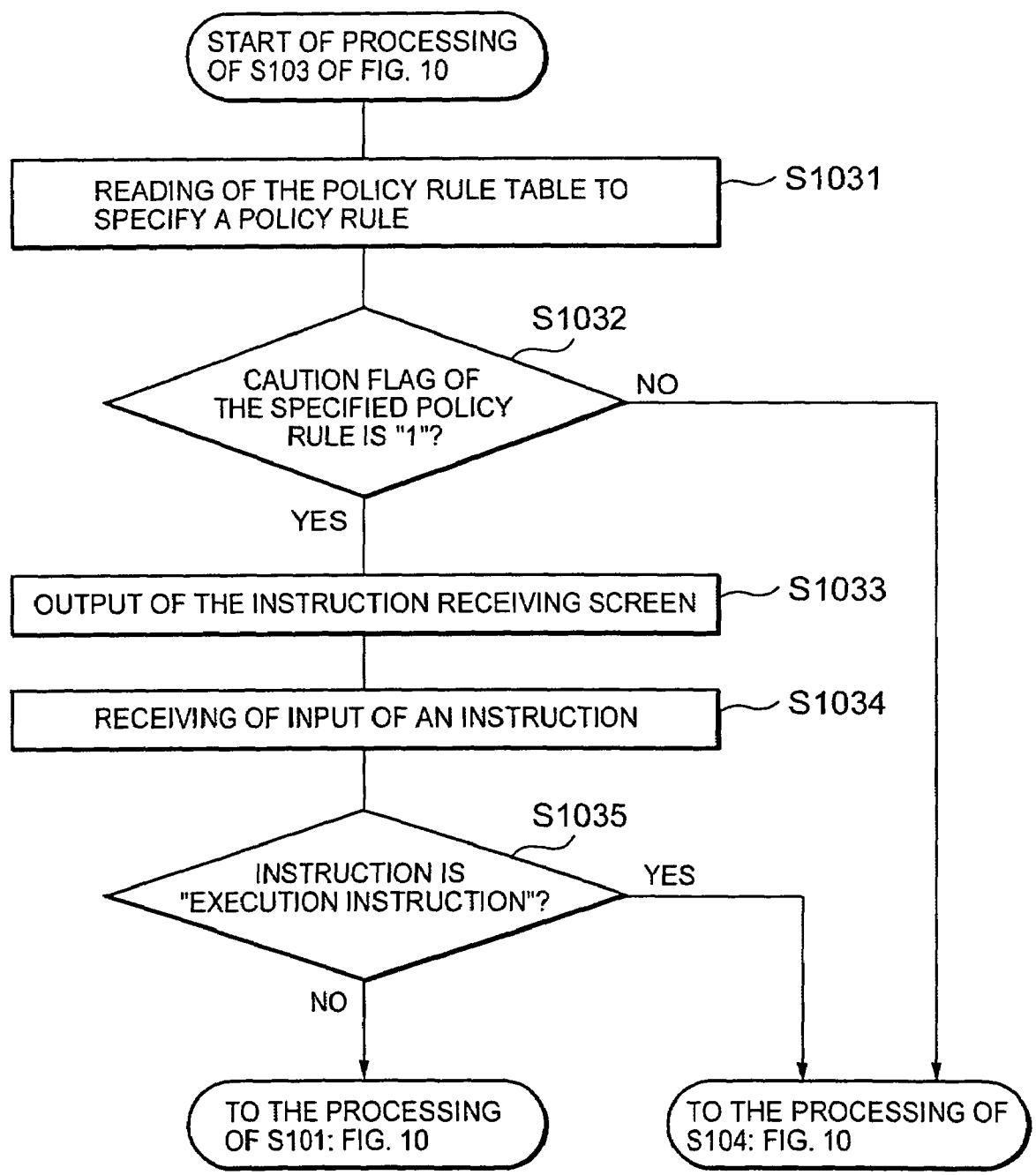

POLICY RULE MANAGEMENT SUPPORT METHOD AND POLICY RULE MANAGEMENT SUPPORT APPARATUS

CLAIM OF PRIORITY

The present application claims priority from Japanese application JP 2004-237178 filed on Aug. 17, 2004, the content of which is hereby incorporated by reference into this application.

BACKGROUND OF THE INVENTION

The present invention relates to a technique of managing policy rules.

Japanese Non-examined Patent Laid-open No. 2003-095139 (hereinafter referred to as Patent Document 1) describes an intrusion detection and management system that detects a change in a network configuration and distributes an unauthorized access detection policy to a device that has been added or changed by the configuration change. Further, Non-examined Patent Laid-open No. 2001-257718 (hereinafter referred to as Patent Document 2) describes a multicast method that manages multicast routing information in a centralized manner, detects a change in a configuration of a network and notifies the configuration change to network apparatuses to which a routing information change notification should be sent.

When there is a change in a configuration of a system to which policy rules are applied, sometimes conflicts occur and cause a system failure unless the policy rules are changed also. Policy rules are rules each prescribing an operation (a coping operation) to be performed when a certain event occurs.

For example, it is assumed that, in a system where a certain work is performed using an application server and a database server, processing in the application server is a bottleneck. Further, it is assumed that there is a policy rule that an application server is added when a response time of the certain work exceeds a threshold. When the current application server is upgraded to a high performance server, then the database server becomes a bottleneck this time. As a result, it is necessary to modify (change) the policy rule to one matching with the changed system configuration. The above-cited Patent Documents 1 and 2 do not consider modification of policy rules.

The present invention has been made taking the above situation into consideration. And, an object of the present invention is to prevent a failure to modify a policy rule that should be modified in accordance with a change in a configuration of a system.

SUMMARY OF THE INVENTION

To solve the above problem, according to the present invention, a notification of a configuration change of a computer system is received, and policy rules that may be affected by the configuration change are listed.

For example, in a policy rule management support method performed by an information processing apparatus for supporting management of policy rules in a computer system, the policy rules are operation management procedures in the computer system. The information processing apparatus comprises a processing unit and a policy rule storage unit that stores at least one policy rule for each component of the computer system. For each component of the computer system, the processing unit performs: a receiving step, in which a configuration change notification is received; a detection step, in which at least one component affected by the configuration change notification received with respect to a component in the receiving step is detected; and a generation step, in which policy rules associated respectively with the components detected in the detection step are specified from the policy rule storage unit and a list of the specified policy rules is generated.

According to the present invention, when a change in a configuration of a system occurs, a list of policy rules that can be affected by the configuration change is generated. As a result, it is possible to support management of policy rules that are consistent with the system after the configuration change.

BRIEF DESCRIPTION OF THE DRAWINGS

FIG. 5 is a diagram showing an example of a managed object table;

FIG. 6 is a diagram showing an example of a dependency relation table;

FIG. 7 is a diagram showing an example of an operation management table;

FIG. 8 is a diagram showing an example of a policy table;

FIG. 15 is a diagram showing an example of a policy rule table having a caution flag; and FIG. 16 is a flowchart for the event receiving unit in the case where the caution flag exists.

DETAILED DESCRIPTION

Now, embodiments of the present invention will be described.

Figure 1:
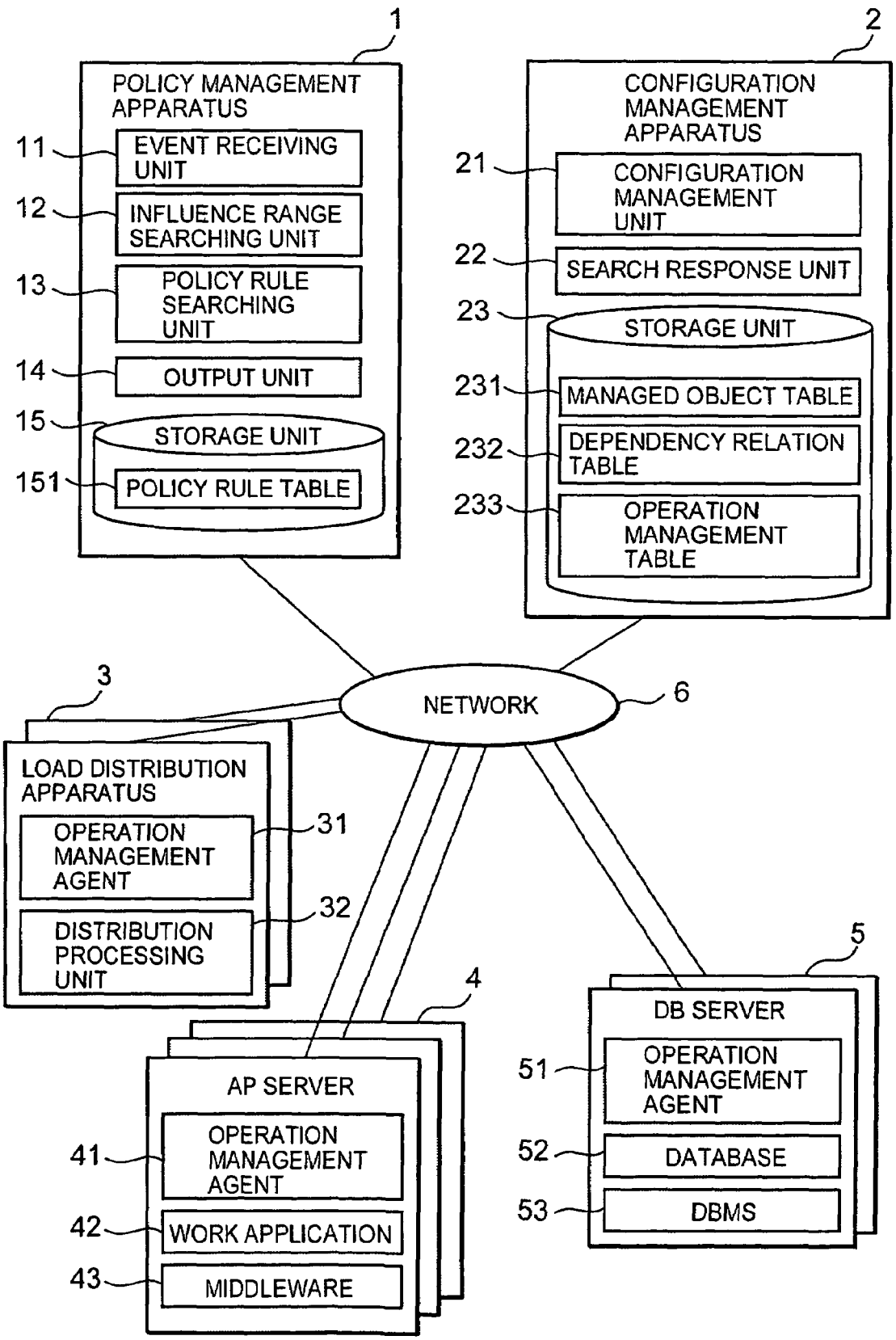
FIG. 1 is a block diagram showing a general configuration of a system to which one embodiment of the present invention is applied.

FIG. 1 is a block diagram showing a general configuration of a system to which one embodiment of the present invention is applied. As shown in the figure, the system of the present embodiment comprises a policy management apparatus 1 that manages policy rules, a configuration management apparatus 2 that manages a system configuration, a load distribution apparatus 3, an application server (hereinafter, referred to as an AP server) 4, and a data base server (hereinafter, referred to as a DB server) 5. These apparatuses 1-5 are connected with one another through a network 6 such as Internet.

As shown in the figure, the policy management apparatus 1 comprises an event receiving unit 11, an influence range searching unit 12, a policy rule searching unit 13, an output unit 14, and a storage unit 15. The event receiving unit 11 receives an event message (which is described below) from the configuration management apparatus 2. The influence range searching unit 12 searches for a range influenced by the event message received by the event receiving unit 11. The policy rule searching unit 13 searches a policy rule table 151 (which is described below) for a policy rule to be changed. The output unit 14 outputs a policy rule retrieved by the policy rule searching unit 13.

The storage unit 15 stores the policy rule table 151. Policy rules are rules each prescribing an operation (processing) to be performed automatically when a certain event occurs. For an example, it may be employed as a policy rule to add a server for performing a certain work when a response time of that work exceeds a given time.

As shown in the figure, the configuration management apparatus 2 comprises a configuration management unit 21, a search response unit 22 and a storage unit 23. The configuration management unit 21 receives configuration change information (of a managed system) inputted from an input device, and updates various tables stored in the storage unit 23. The search response unit 22 receives a search request sent from the policy management apparatus 1, specifies a managed object requested, and notifies the policy management apparatus 1 of the specified managed object. A managed object will be described later referring to FIG. 4. The storage unit 23 stores a managed object table 231, a dependency relation table 232, and an operation management table 233. These tables will be described later.

The load distribution apparatus 3 distributes processing (transactions) to parallel-connected apparatuses so as to equalize a load of each apparatus. As shown in the figure, the load distribution apparatus 3 comprises an operation management agent 31 and a distribution processing unit 32. The operation management agent 31 receives an instruction from the configuration management apparatus 2 to perform various operations. The distribution processing unit 32 distributes processing so as to equalize a load of each apparatus connected to the load distribution apparatus 3.

The AP server 4 is an apparatus that performs work processing. As shown in the figure, the AP server 4 comprises an operation management agent 41 and a work application 42 and middleware 43. The operation management agent 41 receives an instruction from the configuration management apparatus 2 to perform various operations. The work application 42 is application software (program) that performs work processing. The middleware 43 is software that runs on an OS (Operating System) and, in comparison with the OS, provides higher level and more specific functions to the work application The DB server 5 is an apparatus that provides various data to the AP server 4. As shown in the figure, the DB server 5 comprises an operation management agent 51, a database 52, and a DBMS (DataBase Management System) 53. The operation management agent 51 receives an instruction from the configuration management apparatus 2 to perform various operations. The DBMS 53 is software that manages the database and responds to a data access request from the AP server 4. The DBMS 53 is a kind of middleware.

Figure 2:
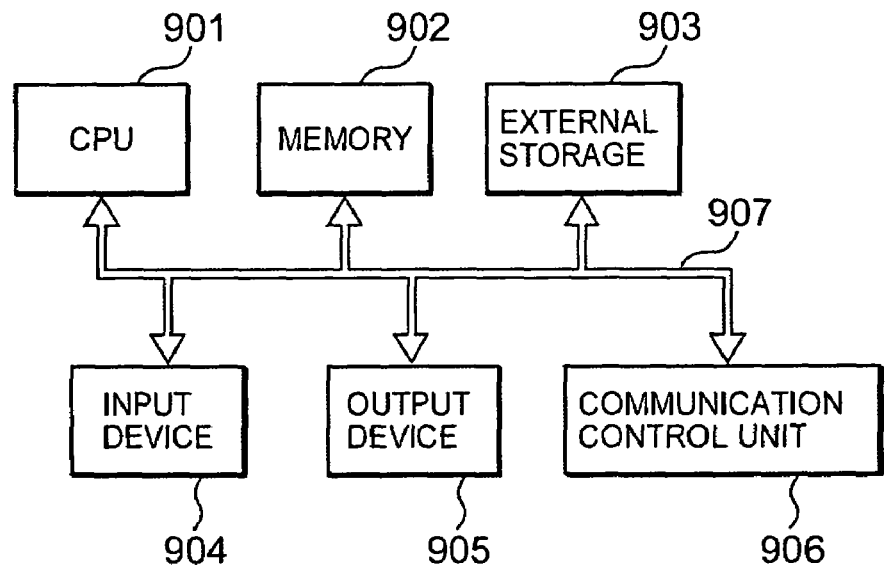
FIG. 2 is a diagram showing a hardware configuration of each unit.

The above-described policy management apparatus 1, configuration management apparatus 2, load distribution apparatus 3, AP server 4 and DB server 5 can be each implemented by a general-purpose computer system, as shown for example in FIG. 2, comprising a CPU 901, a memory 902, an external storage 903 such as a HDD, an input device 904 such as a keyboard or a mouse, an output device 905 such as a display or a printer, a communication control unit 906 for connecting with a network, and a bus 907 for connecting these components. Each function of each apparatus is realized on such a computer system, when a certain program loaded on the memory 902 is executed by the CPU 901. For example, each function of the policy management apparatus 1, the configuration management apparatus 2, the load distribution apparatus 3, the AP server 4 and the DB server 5 is realized when a program for the policy management apparatus 1 is executed by the CPU 901 of the policy management apparatus 1, a program for the configuration management apparatus 2 by the CPU 901 of the configuration management apparatus 2, a program for the load distribution apparatus 3 by the CPU 901 of the load distribution apparatus 3, a program for the AP server 4 by the CPU 901 of the AP server 4, and a program for the DB server 5 by the CPU 901 of the DB server 5. As the storage unit 15 of the policy management apparatus 1, is used the memory 902 or the external storage 903 of the policy management apparatus 1. Further, as the storage unit 23 of the configuration management apparatus 2, is used the memory 902 or the external storage 903 of the configuration management apparatus 2.

Next, will be described a managed system that is managed by the policy management apparatus 1 and the configuration management apparatus 2, and a configuration of managed objects of the managed system.

Figure 3:
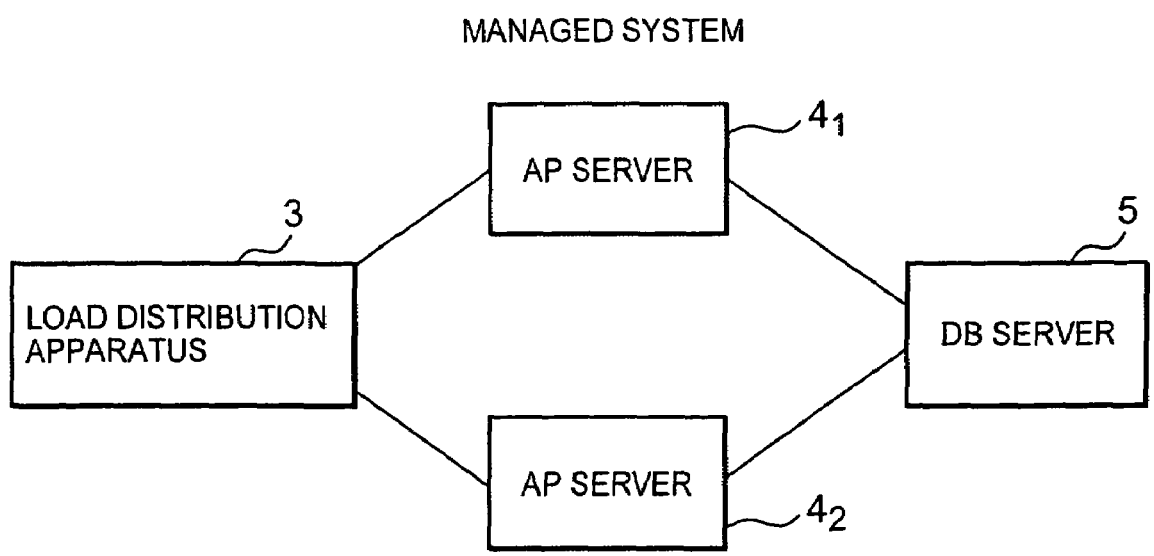
FIG. 3 is a diagram showing an example of a system configuration of a managed system.

FIG. 3 is a diagram showing an example of a managed system in the system shown in FIG. 1. The system shown in the figure is a system corresponding to the application layer and the database layer of the Web 3-hierarchical structure. Namely, the present system comprises the load distribution apparatus 3, at least one AP server 4, and the DB server 5. The load distribution apparatus 3 distributes processing to the parallel-connected AP servers so as to equalize a load of each AP server. Each of the at least one AP server 4 accesses the database stored in the DB server 5 to perform the work processing. Based on each request from a plurality of AP servers 4, the DB server 5 searches for or updates data stored in the database.

Figure 4:
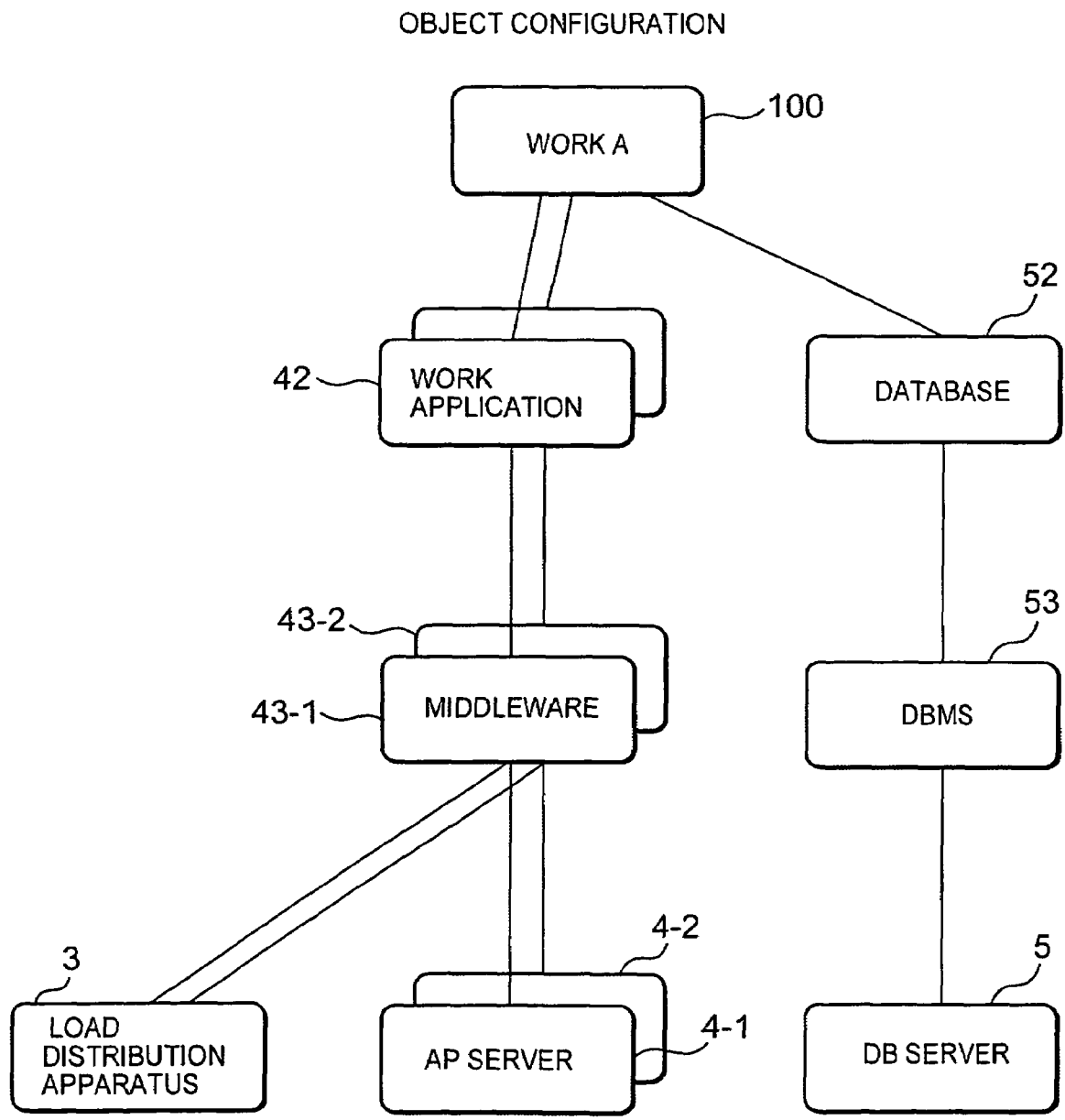
FIG. 4 is a diagram showing an example of a managed object diagram of the managed system.

FIG. 4 shows structure of configuration information of the managed system shown in FIG. 3. In the present embodiment, configuration information of a system is held as hierarchical structure using at least one managed object such as the database 52 and the AP servers 4 and dependency relations (shown, in FIG. 4, as lines connecting managed objects) between managed objects. FIG. 4 is provided only for explaining the present embodiment. In fact, the configuration information consisting of the managed objects described here and the dependency relations between the managed objects are stored and managed using three tables described below, i.e., the managed object table 231, the dependency relation table 232 and the operation management table 233.

The managed object are virtual objects meaning components of the managed system, and used so that the configuration management apparatus 2 can manage the configuration information of the managed system in a centralized manner. One managed object corresponds to one component of the managed system, and may be software such as a work application or middleware, hardware such as a server, a database, or the like.

Further, dependency relations between the managed objects are used for holding information that there is a dependency between components (of the managed system) corresponding to the managed objects associated by each dependency relation, as a part of the configuration information. For example, FIG. 4 shows information (a line connecting between the DBMS 53 and the DB server 5) that there is a dependency between the DBMS 53 in an upper layer and the DB server 5 in a lower layer. This indicates that, in the managed system shown in FIG. 3, the DBMS 53 (not shown in FIG. 3) is executed on the DB server 5 and thus depends on the DB server 5. In other words, it means that when a failure occurs in the DB server 5, a failure also occurs in the DBMS 53.

In the managed object configuration shown in the figure, a managed object of work A 100 is positioned in the highest layer. The managed object of the work A 100 plays a role of an index (pointer) for managed objects in the lower layers. As described referring to FIG. 3, the managed object of the work A 100 has the application layer and the database layer. The application layer has at least one work application 42 in the lower layer to the work A 100, middleware 43 in the lower layer to each work application 42, an AP server 4 and the load distribution apparatus 3 as hardware in the lower layer to each piece of middleware 43.

Further, the database layer has the database 52 in the lower layer to the work A 100, the DBMS 53 in the lower layer to the database 52, and the DB server 5 as hardware in the lower layer to the DBMS 53. Thus, in the lowest layer, are positioned the managed objects of hardware 4 and 5 that mount (incorporate) software or the database. In the upper layers to the hardware 4 or 5, is positioned the managed object of base software (i.e., software on which other software depends) 43 or 53. And, in the upper layers to the base software 43 or 53, is positioned of the managed object 42 or 52 of software (i.e., software depending on the software 43) or the database (i.e., the database depending on the software 53) that runs on the software 43 or 53.

Next, will be described the managed object table 231, the dependency relation table 232 and the operation management table 233 stored in the storage unit 23 of the configuration management apparatus 2.

FIG. 5 shows an example of the managed object table 231. The managed object table 231 is a table that stores the managed objects of the managed system described referring to FIG. 4. As shown in the figure, the managed object table 231 holds an object name 501, an object type 502 and detailed information 503 for each managed object. The object name 501 is a name of the managed object concerned, which is a unique name. The object type 502 indicates a type of the managed object, such as an AP server, middleware, a work application, or the like.

The detailed information 503 is set with information that is different for each object type 502. For example, when the object type 502 is an AP server, the detailed information 503 is set with a CPU name and the like. When the object type 502 is middleware, the detailed information 503 is set with its product name, its version and the like.

FIG. 6 shows an example of the dependency relation table 232. The dependency relation table 232 is a table that associates each managed object with a managed object that operates on the managed object in question (i.e., a managed object in the higher layer to the managed object in question). As shown in the figure, the dependency relation table 232 holds an object name 601 and an upper object name 602 for each managed object. The upper object name 602 is set with an object name of a managed object that is positioned in the higher layer to the managed object whose name is set in the object name 601 concerned.

The hierarchical structure among the managed objects is as described with respect to the managed object configuration of FIG. 4. For example, when the object name 601 is "AP server 4-1", its upper object name 602 is "Middleware 43-1". Further, "Work A" is the managed object in the highest layer, and thus, the object name 602 for the "Work A" is "space". By holding such a dependency relation table 232, the configuration management unit 21 can specify a managed object that is affected when a change occurs in a managed object of the managed system.

FIG. 7 shows an example of the operation management table 233. The operation management table 233 is a table that stores a method of a managed object, for each managed object having a method. A method is an operation (a procedure) of operation management performed regarding the managed object concerned itself. As shown in the figure, the operation management table 233 holds an object name 701, an operation name 702, an agent address 703 and an agent port number 704 for each managed object having a method. The object name 701 is set with a name of a managed object having a method. The operation name 702 is set with a name of the method (operation). The agent address 703 is set with an IP address of the managed object set in the object name 701. Further, the agent port number 704 is set with a port number used for communication with the managed object set in the object name 701. A port number is a sub-address (an auxiliary address) provided under the IP address for connecting with a plurality of partners at the same time in the Internet communication. In the case shown, when an object name 701 is "middleware 43-1", the operation name 702 is set with "Activation of work" indicating an operation of activating the work.

Here, it is assumed that the managed object table 231, the dependency relation table 232 and the operation management table 233 described above are previously stored in the storage unit 23 by an administrator through the input device 904, through the network 6, or the like.

Next, will be described the policy rule table 151 stored in the storage unit 15 of the policy management apparatus 1. The policy rule table 151 stores rules (policy rules) each prescribing an operation (processing) to be performed for a certain event when the event occurs in the managed system.

FIG. 8 shows an example of the policy rule table. As shown in the figure, the policy rule table 151 holds an object name 801, an event name 802, a sequential number 803, an operation object name 804, an operation name 805 and an argument 806. The event name 802 is set with a name of an event detected by the operation management apparatus 2. The sequential number 803 is set with a sequential number starting from 1 for each policy rule (each group of records having the same object name 801 and the same event name 802). The policy management apparatus 1 gives instructions of respective operations designated in the operation names 805, in the order of the sequential numbers 803. The operation object name 804 is set with an object name of a managed object that becomes an object of the operation. The operation name 805 is set with a name of the operation. The argument 806 is set with data (a parameter) that is delivered when the managed object as the object of the operation is instructed to perform the operation designated in the operation name 805.

Next, will be described an event message sent by the configuration management apparatus 2 to the policy management apparatus 1. The configuration management unit 21 of the configuration management apparatus 2 monitors or detects various events occurring in the managed system. For example, when a response time of the work under the monitoring exceeds a prescribed threshold, or when a failure or configuration change in a managed object of the system under the monitoring is detected, the configuration management unit 21 generates an event message and sends the event message to the policy management apparatus 1.

Figure 9:
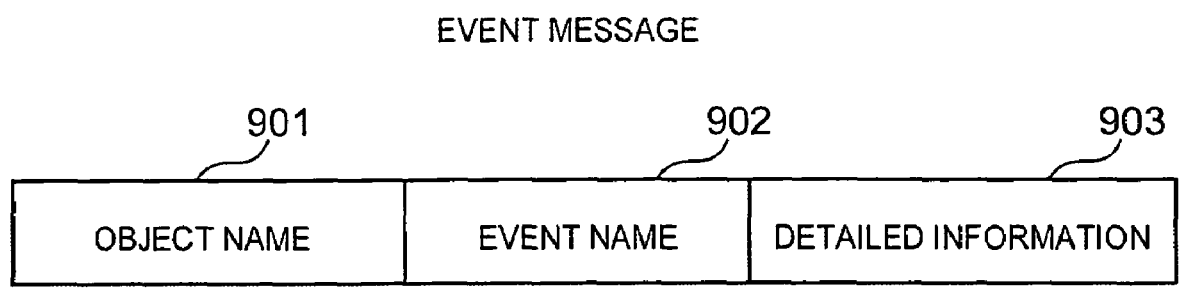
FIG. 9 is a diagram showing an example of an event message.

FIG. 9 shows an example of an event message. As shown in the figure, an event message has an object name 901, an event name 902 and detailed information 903. The object name 901 is set with a name of a managed object in which an event has occurred. The event name 902 is set with a name of the event that has occurred, such as "Configuration change", "Response time too long", or the like. The configuration management unit 21 monitors a response time of a prescribed work, and generates an event message whose event name 902 is set with "Response time too long" when the monitored response time exceeds a prescribed threshold. Further, when data of a table 231, 232 or 233 stored in the storage unit 23 are updated, the configuration management unit 21 generates an event message whose event name 902 is set with "Configuration change". Further, when a failure in a managed object is detected, the configuration management unit 21 generates an event message whose event name 902 is set with "Failure".

The detailed information 903 is set with detailed information on the event set in the event name 902. For example, when the object name 901 is "AP server 4-1" and the event name 902 is "Configuration change", then the detailed information 903 is set with a CPU name after the change. Or, when the object name 901 is "Work A" and the event name 902 is "Response time too long", then the detailed information 903 is set with a response time exceeding the threshold.

Next, a processing flow of the policy management apparatus 1 will be described.

Figure 10:
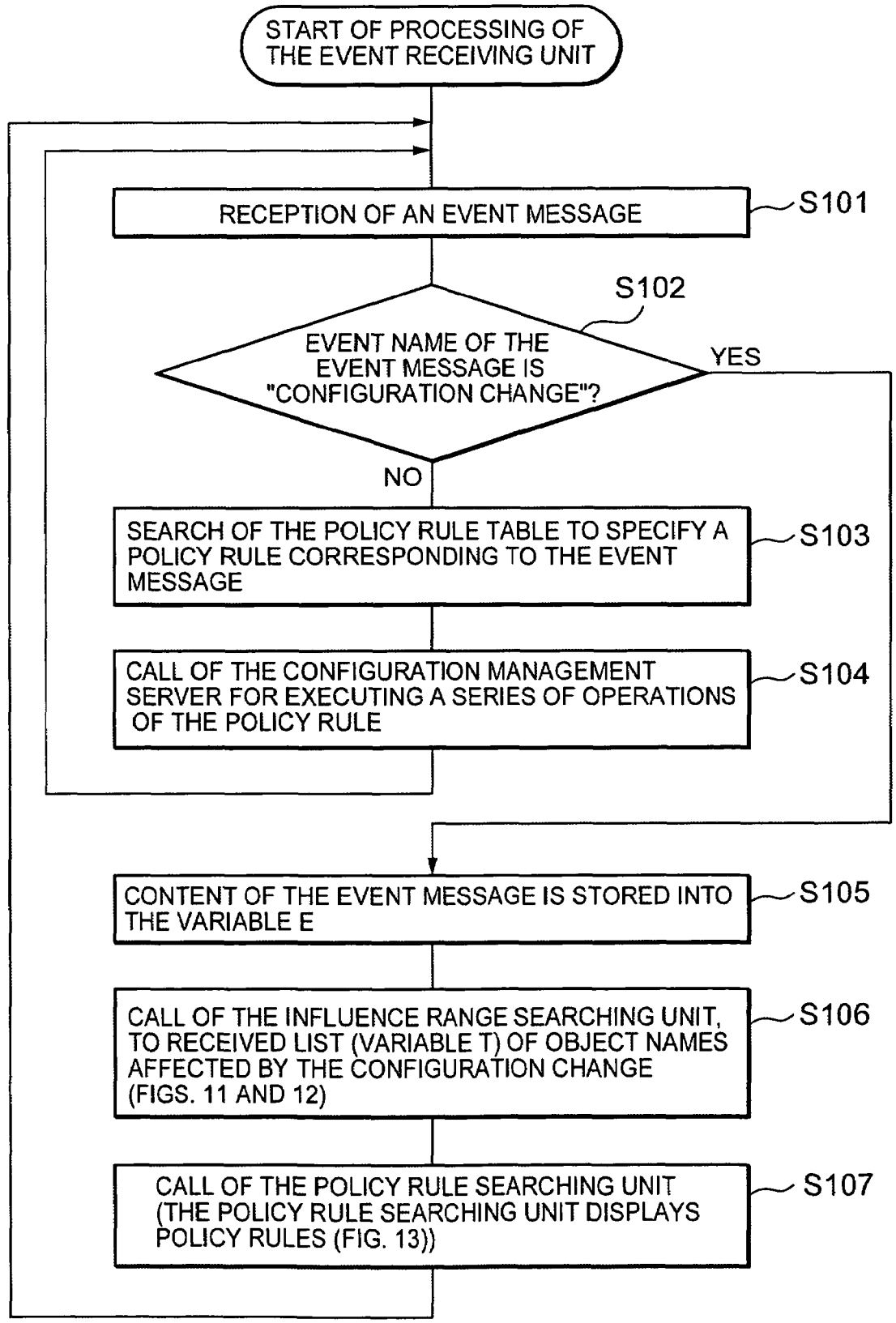
FIG. 10 is a flowchart for an event receiving unit.

FIG. 10 shows a processing flow of the event receiving unit 11 of the policy management apparatus 1. The event receiving unit 11 receives an event message (See FIG. 9) sent (notified) from the configuration management apparatus 2 (S101). The event receiving unit 11 in a waiting state until an event message is received. Then, the event receiving unit 11 judges whether the event name 902 of the received event message is "Configuration change" or not (S102).

In the case where the event name 902 is not "Configuration change" (S102: No), the event receiving unit 11 reads the policy rule table 151 stored in the storage unit 15 to specify the policy rule corresponding to the event message (S103). Namely, the event receiving unit 11 searches the policy rule table 151 for a policy rule (at least one record) that has the same object name and the same event name as the object name 901 and the event name 902 of the event message. For example, in the case where the object name 901 and the event name 902 of the event message are "Work A" and "Response time too long" respectively, the event receiving unit 11 specifies the policy rule (at least one record) 810 having the object name "Work A" and the event name "Response time too long".

Then, the event receiving unit 11 calls the configuration management apparatus 2 for each record of the policy rule (at least one record) specified from the policy rule table, in the order of the sequential number 803 (S104). Namely, the event receiving unit 11 sends a message including the operation object name 804, the operation name 805 and the argument 806 of the record in question to the configuration management apparatus 2 (i.e., performs the so-called method call).

Receiving the message sent from the event receiving unit 11, the configuration management unit 21 of the configuration management apparatus 2 reads the operation management table 233 (See FIG. 7). Then, from the operation management table 233, the configuration management unit 21 specifies a record having the same object name 701 and the same operation name 702 as the operation object name 804 and the operation name 805 included in the message. Then, the configuration management unit 21 sends an instruction of the operation designated in the operation name 702 of the specified record to the managed object designated in the object name 701 having the agent address 703 and the agent port number 704 of the specified record as the destination address. When the configuration management unit 21 instructs the operation, the configuration management unit 21 also sends the argument 806 included in the message received from the event receiving unit 11.

The operation management agent 31, 41 or 51 of a certain apparatus (the load distribution apparatus 3, the AP server 4, the DB server, or the like) of the managed system receives the operation instruction including the argument 806 from the configuration management apparatus 2, and performs the designated operation on the designated object. For example, the operation management agent 41 of the AP server 4 performs an operation management procedure on a managed object, i.e., the middleware 43 or the AP server 4 as a component in the managed system. In the case where the operation management agent 41 receives an operation instruction having the operation name 805 "Activation of work" and the argument 806 "Program name=W", the operation management agent 41 uses the OS of the AP server 4 on which the operation management agent 41 itself runs, to instruct the middleware 43 to activate the work program having the program name "W".

On the other hand, in the case where the event name is "Configuration change" (S102: YES), the event receiving unit 11 stores the received event message as a variable E into a register or the storage unit 15 (S105). Then, the event receiving unit 11 calls the influence range searching unit 12. Then, the event receiving unit 11 receives a list of names of objects that may be affected by the event message in question (i.e., receives a processing result of the influence range searching unit 12) (S106). The processing by the influence range searching unit 12 will be described later.

Then, the event receiving unit 11 calls the policy rule searching unit 13 (S107). Then, the policy rule searching unit 13 lists policy rules corresponding to the object name list generated by the influence range searching unit 12. The operation by the policy rule searching unit 13 will be described later. When the processing of the policy rule searching unit 13 ends, the event receiving unit 11 returns to the state awaiting an event message (S101).

Next, will be described a processing flow of the influence range searching unit 12.

Figure 11:
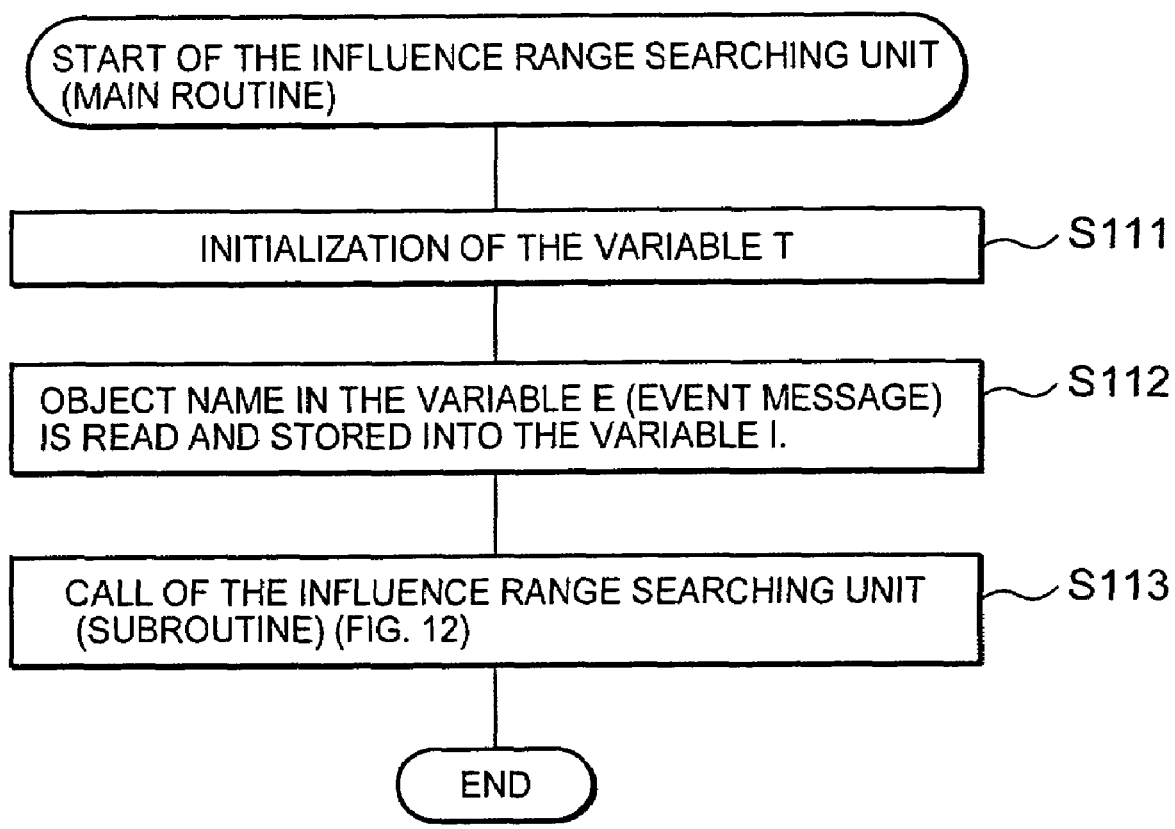
FIG. 11 is a flowchart showing a main routine of an influence range searching unit.

FIG. 11 shows a processing flow of the influence range searching unit 12. When the main routine of the influence range searching unit 12 is called from the event receiving unit 11 (FIG. 10: S106), the main routine initializes an area of a variable T used in the following processing (S111). It is assumed that the area of the variable T is set in the register or the storage unit 15. The main routine of the influence range searching unit 12 the object name of the variable E (the event message) that the event receiving unit 11 has stored in the register or the storage unit 15, and stores the object name as a variable I into the register or the storage unit 15 (S112). Then, the main routine of the influence range searching unit 12 calls a subroutine of the influence range searching unit 12 (S113).

Figure 12:
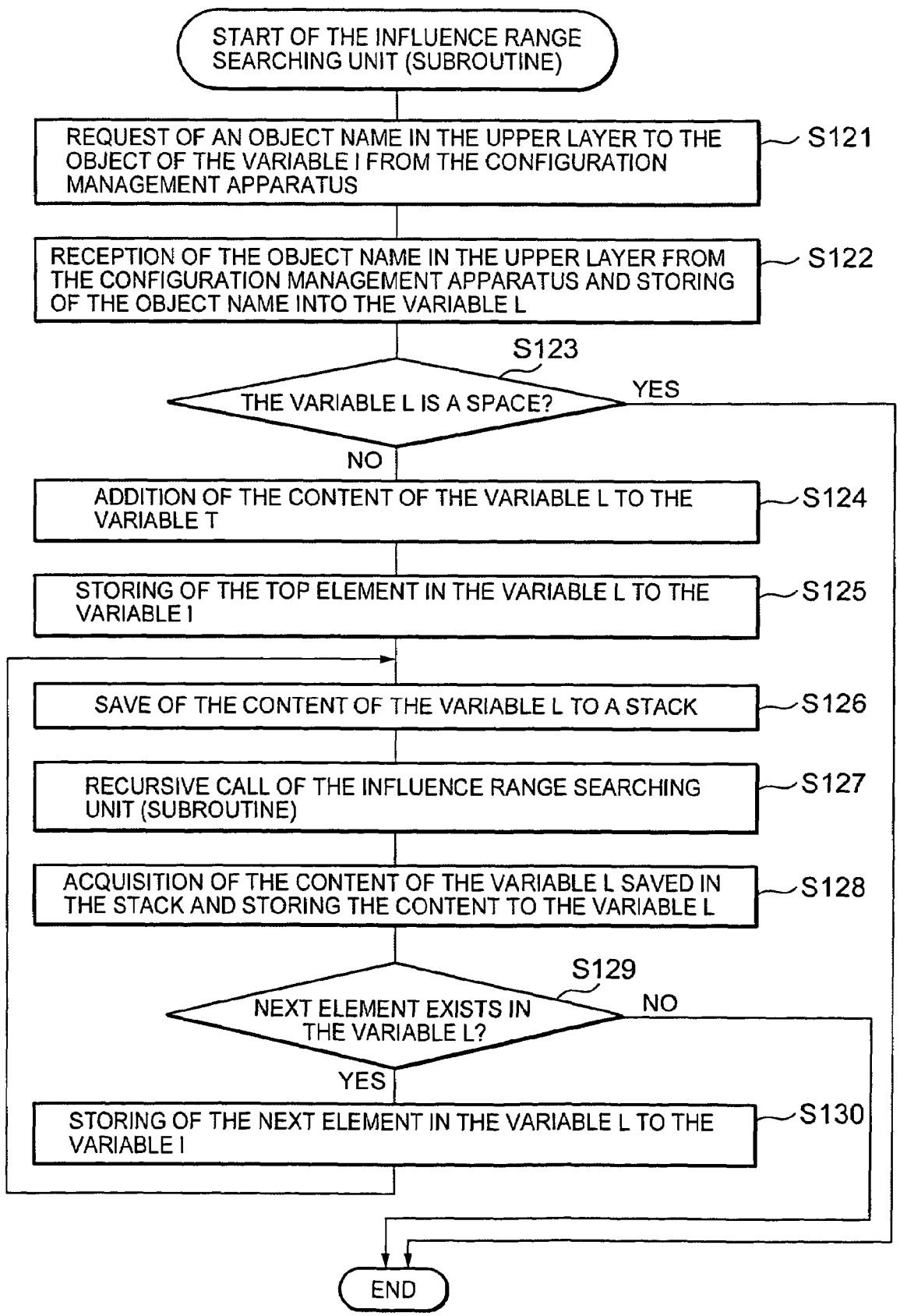
FIG. 12 is a flowchart showing a subroutine of the influence range searching unit.

FIG. 12 shows a processing flow of the subroutine of the influence range searching unit 12. When the subroutine of the influence range searching unit 12 is called from the main routine (FIG. 11: S113), the subroutine requests an object name in the upper layer to the object name set in the variable I from the configuration management apparatus 2 (S121). The search response unit 22 of the configuration management apparatus 2 reads the dependency relation table 232 (See FIG. 6), to specify a record whose object name 601 coincides with the variable I. Then, the search response unit 22 sends the upper object name 602 of the specified record to the policy management apparatus 1.

Here, sometimes there is a case where a plurality of upper object names 602 exist as in the case where one server (a lower managed object) has kinds of middleware (upper managed objects), for example. In that case, the search response unit 22 sends a plurality of upper object names 602. Further, there is a case where the upper object name 602 is a space as in the case of the managed object of the highest layer (for example, the case of the work A). In that case, the search response unit 22 sends a space.

Then, the subroutine of the influence range searching unit 12 receives the upper object name 602 from the configuration management apparatus 2, and stores the received upper object name as a variable L into the register or the storage unit 15 (S122). Then, the subroutine of the influence range searching unit 12 judges whether the variable L is a space or not (S123). In the case where the variable L is a space (S123: YES), the subroutine of the influence range searching unit 12 ends the processing, and the processing returns to the main routine.

On the other hand, in the case where the variable L is not a space (S123: NO), the subroutine of the influence range searching unit 12 adds the content of the variable L to the area of the variable T (FIG. 11: S111) (S124). Then, the subroutine of the influence range searching unit 12 stores the top element (the upper object name 602) of the variable L into the area of the variable I (S125). Then, the subroutine of the influence range searching unit 12 saves the content of the variable L in a stack (S126). Then, the subroutine of the influence range searching unit 12 recursively calls itself, i.e., the subroutine of the influence range searching unit 12 (S127).

Then, after the processing of the recursively called subroutine ends, the subroutine of the influence range searching unit 12 takes out the content of the variable L saved in the stack and stores the content into the area of the variable L (S128). Then, the subroutine of the influence range searching unit 12 judges whether the next element (an upper object name 602 that has not been treated yet) exists in the variable L (S129). In the case where there does not exist a next element (S129: NO), the subroutine of the influence range searching unit 12 ends the processing, and the processing returns to the main routine. On the other hand, in the case where the next element exists (S129: YES), the subroutine of the influence range searching unit 12 stores the next element of the variable L into the area of the variable I, and returns to the processing of S126 (S130).

As described above, the influence range searching unit 12 acquires all the object names in the upper layers than the managed object set in the object name 901 of the event message, and stores the acquired object names into the area of the variable T. Namely, the influence range searching unit 12 generates the variable T listing all the object names that may be affected by the configuration change of the object set in the object name of the event message. Then, the influence range searching unit 12 ends the processing, and the flow returns to the processing by the event receiving unit 11 (FIG. 10: S106).

Next, will be described a processing flow of the policy rule searching unit 13.

Figure 13:
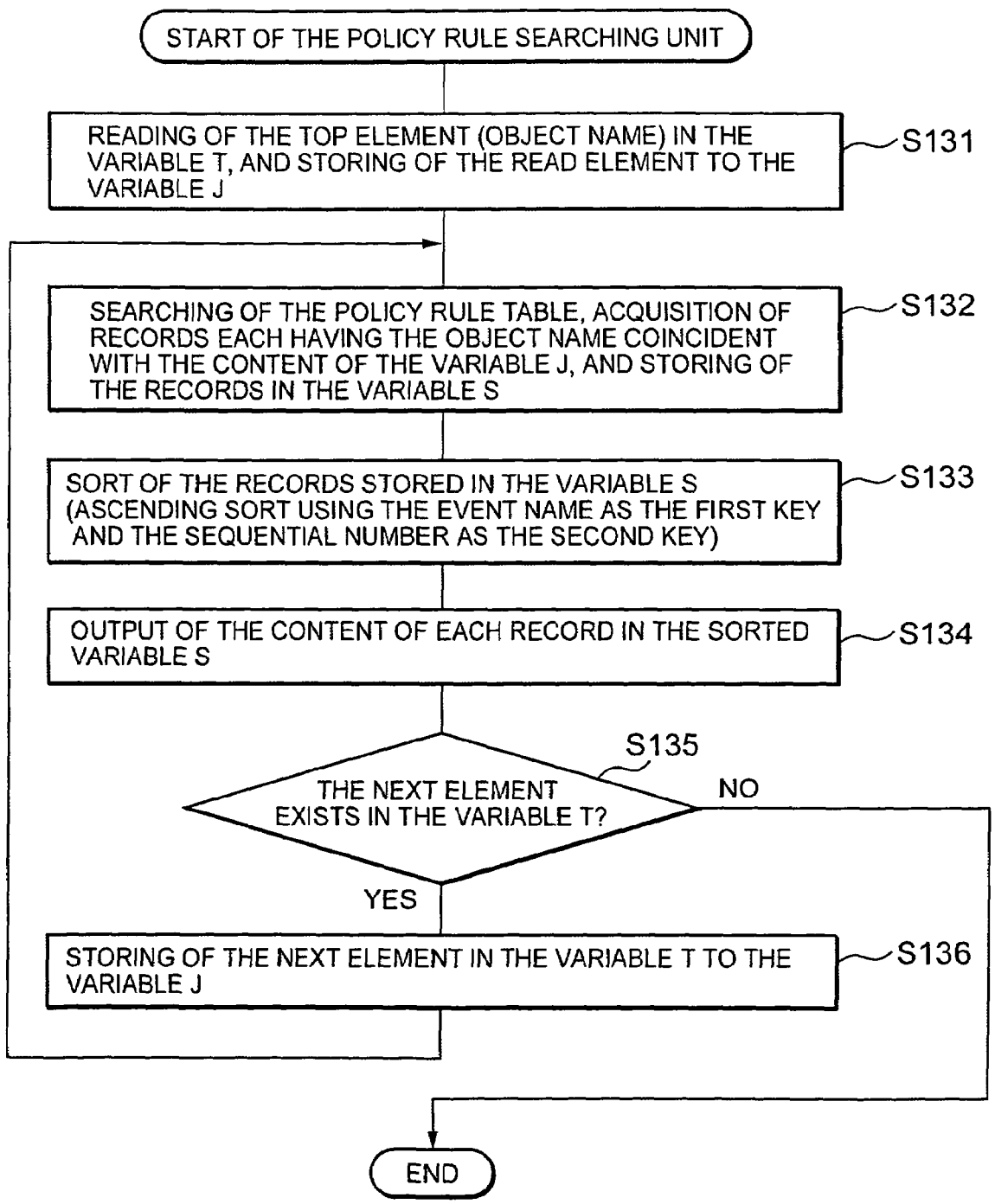
FIG. 13 is a flowchart for a policy rule searching unit.

FIG. 13 shows a processing flow of the policy rule searching unit 13. When the policy rule searching unit 13 is called from the event receiving unit 11 (FIG. 10: S107), the policy rule searching unit 13 reads the top element (an object name) of the variable T and stores as a variable J into the register or the storage unit 15 (S131). Then, the policy rule searching unit 13 searches the policy rule table 151, to extract all the records each having the object name 801 that coincides with the variable J. Then, the policy rule searching unit 13 stores the extracted records as a variable S into the register or the storage unit 15 (S132). Then, the policy rule searching unit 13 sorts the records stored in the variable S (S133). Namely, the policy rule searching unit 13 rearranges the records in the variable S in the ascending order, using the event name 802 of each record as a first sort key and the sequential number 803 as a second sort key. The sorted content of the variable S is outputted onto the output device 905 through the output unit 14 (S134). An output screen outputted onto the output device 905 will be described later.

Then, the policy rule searching unit 13 judges whether the next element (an object name that has not been treated yet) exists in the variable T (S135). In the case where the next element exists in the variable T (S135: YES), the policy rule searching unit 13 sets the content of the next element in the variable J, and the flow returns to the processing of S132 (S136). On the other hand, in the case where a next element does not exist in the variable T (S135: No), the policy rule searching unit 13 ends the processing, and the flow returns to the processing by the event receiving unit 11 (FIG. 10: S107).

As described above, the policy rule searching unit 13 lists policy rules corresponding to the all the object names set in the variable T, from the policy rule table 151, and outputs the list to the output device 905. Then, the policy rule searching unit 13 ends the processing, and the flow returns to the processing by the event receiving unit 11 (FIG. 10: S107). Then, the event receiving unit 11 is again in the state of awaiting an event message from the configuration management apparatus 2.

Figure 14:
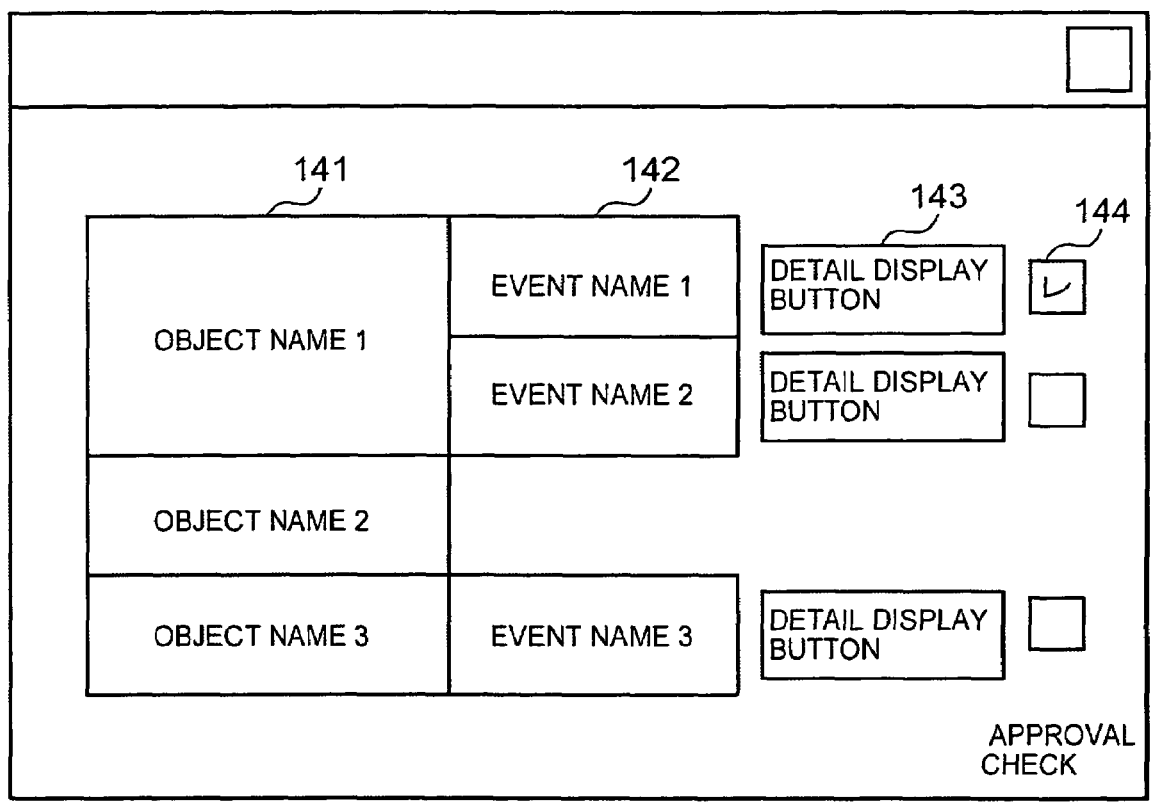
FIG. 14 is a view showing an example of an output screen for a policy rule list.

FIG. 14 shows an example of the output screen that is outputted by the policy rule searching unit 13 to the output device 905 through the output unit 14.

As shown in the figure, the output screen has object names 141, event names 142 corresponding to respective object names, a detail display buttons 143 for displaying detailed contents of the event names respectively, and approval check boxes 144 each for receiving an approval instruction. The object names 141 display the respective object names listed in the variable T. The event names 142 display the respective event names 802 of the records that have been retrieved with respect to the respective managed objects concerned from the policy rule table. In the case where there does not exist a policy rule corresponding to an object name listed in the variable T, an event name 142 corresponding to that object name is not displayed.

When the policy rule searching unit 13 receives a push of a detail display button 143 displayed in association with an event name 802 through the input device 904 or the like, then, the policy rule searching unit 13 extracts records (a policy rule) having the corresponding object name 141 and the corresponding event name 142 from the variable S or the policy rule table 151, and outputs the extracted records on the output device 905. As for the approval check boxes 144, when the administrator has modified a policy rule for an event displayed in this output screen, or has judged that modification is not necessary, the administrator inputs a check mark ($\sqrt{}$). As a result, it is easy to prevent a failure to modify a policy rule.

Hereinabove, the present embodiment has been described.

According to the above embodiment, an event message of a configuration change is received, policy rules that can be affected by the configuration change are listed, and the list is outputted to the output device. As a result, the administrator can effectively check whether there exists a policy rule that causes conflicts in (or, that is not compatible with) the system after the configuration change. Further, as for a policy rule that becomes conflicts in the system after the configuration change, it is possible to quickly modify that policy rule.

Further, by listing policy rules that can be affected by a configuration change, it is possible to prevent a failure to modify a policy rule that should be modified even when a very large number of policy rules are registered in the policy rule table 151.

The present invention is not limited to the above embodiment, and can be variously changed within the scope of the invention. For example, in the above embodiment, the policy management apparatus 1 receives an event message (See FIG. 9) from the configuration management apparatus 2 through the network 6. However, the policy management apparatus 1 may receive an event message from another apparatus than the configuration management apparatus 2, to list policy rules that can be affected. For example, for a simulation purpose, the administrator may input data corresponding to an event message through the input device 904 of the policy management apparatus 1, to list policy rules that can be affected when the administrator changes a certain managed object. The event receiving unit 11 receives the data inputted through the input device 904 and performs the processing shown in FIG. 10.

Further, the policy rule table 151 may be provided with a caution flag for calling administrator's attention. The caution flag is a flag for making the administrator input an instruction on whether an operation described in a policy rule should be performed or not, when that operation is performed automatically. For example, when the policy management apparatus 1 receives an event message of a configuration change, the processing is performed from S105 of FIG. 10, to list policy rules that can be affected by the configuration change and to output the list to the output device 905. However, sometimes, an event message other than one of the configuration change is sent to the policy management apparatus 1 before the administrator modifies the policy rules so that the policy rules will not cases conflicts in the system after the configuration change.

For example, it is assumed that there is a policy rule indicating that one AP server should be added when a response time of the work A exceeds a prescribed time. Further, it is assumed that the policy management apparatus receives an event message of a configuration change of replacing an AP server with a high performance server. In this case, the DB server becomes a bottleneck for the response time, and the administrator should modify the above policy rule. However, when an event message notifying excess over the response time limit for the work A is received before the administrator modifies the policy rule, the current policy rule (before the modification) is performed inevitably (FIG. 10: S104). In other words, although the AP servers are not the bottleneck any longer, one AP server is added. To avoid this, the caution flag is set for each policy rule listed as a result of a configuration change. Before performing a policy rule for which the caution flag has been set, the administrator is made to input an instruction to indicate whether the operation of the policy rule should be performed or not.

FIG. 15 shows an example of the policy rule table 151A having the caution flag. The policy rule table 151A shown in the figure is different from the policy table 151 of FIG. 8 in that the policy rule table 151A has the caution flag 807. Each caution flag 807 is set with "0" in the initial state. When a policy rule is listed as a result of a configuration change, the caution flag 807 concerned is set with "1" to caution the administrator. In the processing of S132 of FIG. 13, when the policy rule searching unit 13 specifies records whose object name coincides with the variable J, the policy rule searching unit 13 changes the caution flags of those records from "0" to "1". Further, at the point of time when input of a check mark (√) is received in an approval check box 144 in the output screen shown in FIG. 14, the policy rule searching unit 13 changes the caution flag 807 of the record concerned from "1" to "0" in the policy rule table 151A.

FIG. 16 shows a processing flow of S103 of FIG. 10, which is performed by the event receiving unit 11 in the case where the caution flag exists. In the case where the event name 902 of an event message is not "Configuration change" (S102: NO), the event receiving unit 11 reads the policy rule stored in the storage unit 15, to specify the policy rule (at least one record) corresponding to the event message (S1031). Then, the event receiving unit 11 judges whether the flag of the specified policy rule is set with "1 (cautious)" (S1032). In the case where the flag of the policy rule is set with "0 (initial state)" (S1032: NO), the event management unit 11 proceeds to the processing S104 shown in FIG. 10.

On the other hand, in the case where the flag of the policy rule is set with "1 (cautious)" (S1032: YES), the event management unit 11 outputs an instruction receiving screen to the output device 905 (S103). The instruction receiving screen is one for receiving an instruction of performing the operation of the policy rule or an instruction of canceling the operation. By outputting such an instruction receiving screen to input whether the policy rule should be executed or not, it is possible to avoid execution of the policy rule that is inconsistent with the system after the configuration change.

The event receiving unit 11 receives the instruction inputted by the administrator through the input device 904 (S1034). Then, the event receiving unit 11 judges whether the instruction is a policy rule execution instruction or not (S1035). In the case where the execution instruction is received (S1035: YES), the event receiving unit 11 proceeds to the processing S104 shown in FIG. 10. On the other hand, in the case where a cancellation instruction is received (S1035: NO), the event receiving unit 11 stops the execution of the policy rule, and the flow returns to the processing S101 shown in FIG. 10, to be in the state of awaiting an event message.

Further, in the case where a policy rule whose caution flag 807 is set with "1 (cautious)" in the policy rule table 151A of FIG. 15 having the caution flag (FIG. 10: S104), the event receiving unit 11 may perform the following processing. Namely, the event receiving unit 11 may raise a trace output level for a component (of the managed system) that is an object of the operation management procedure described in a policy rule. In detail, after S103 of FIG. 10 and in the course of performing S104, the event receiving unit 11 performs a series of operation management procedures described in a policy rule in the sequential order through method calls to the configuration management apparatus 2. At that time, when the caution flag is "1" for an operation management procedure to be performed, the event receiving unit 11 performs an operation management procedure having an operation name "Trace level raising" just before performing the operation management procedure to be performed. Receiving a request for the operation management procedure having the operation name "Trace level raising", the configuration management apparatus 2 refers to the operation management table 233, and sends an operation request to one of the operation management agents 31, 41 and 51.

Receiving the operation request, the operation management agent in question performs the operation management procedure for raising the trace level of the component (of the managed system) that is the object of the management by the operation management agent in question. Generally, a component (such as middleware, OS or DBMS) of a managed system always outputs operation information as a trace to a storage unit, so that an administrator can specify a cause of a failure when the failure occurs. Generally, as for a trace outputted by such a component, its detail level can be set as a trace level so that as the trace level is higher, more detailed operation information is outputted. Receiving the operation request having the operation name "Trace level raising", the operation management agent changes the trace level of the component (such as middleware) that is the object of its management.

For example, it is assumed that the policy rule specified in S103 of FIG. 10 has the object name 802 "Work A" and the event name 802 "Response time too long" (See FIG. 15). At that time, the event receiving unit 11 sends operation management procedure requests to the configuration management apparatus 2 in the following order in S104. First, the event receiving unit 11 requests an operation management procedure having the operation name "Trace level raising" (not shown) regarding the managed object having the object name "Middleware 43-2". As a result, the middleware 43-2 of the managed system comes to output more detailed operation information as a trace.

Next, the event receiving unit 11 requests the operation management procedure having the operation name 805 "Activation of work" and the argument 806 "Program name=W" regarding the managed object having the object name "Middleware 43-2". As a result, the middleware 43-2 of the managed system activates the program having the program name "W". Here, since the trace level has been changed already, more detailed conditions (such as events still in progress) in the course of the activation of the program are outputted as a trace.

Next, the event receiving unit 11 requests the operation management procedure having the name "Trace level raising" (not shown) regarding the managed object having the object name "Load distribution apparatus 3". As a result, the load distribution apparatus 3 comes to output more detailed operation information as a trace. Then, the event receiving unit 11 requests the operation management procedure having the operation name 805 "Addition of load distribution destination" and the argument 806 "Middleware 43-2" regarding the managed object having the object name "Load distribution apparatus 3". As a result, the load distribution apparatus 3 of the managed system adds, as a destination of load distribution, the middleware 43-2 of the managed system. However, since the trace level has been changed already, more detailed conditions (such as conditions of changing the network setting) in the course of the adding processing is outputted as a trace.

Similarly, in the case where the event receiving unit 11 itself outputs a trace and its detail level can be set as a trace level, the event receiving unit 11 may raise its own trace level before performing the above-described operation management procedure "Trace level raising". In this case, when the caution flag 807 is "1" for the policy rule specified in S103 of FIG. 10, then, the event receiving unit 11 comes to output more detailed execution information (such as a communication log to the configuration management apparatus 2) on the processing performed by the event receiving unit 11 for executing the policy rule.

As a result, even when execution of a policy rule having the caution flag "1 (cautious)" causes a problem, the administrator can refer to detailed trace information to employ swift measures to solve the problem.

The invention claimed is:

1. A policy rule management support method, which is performed by an information processing apparatus for supporting maintenance of policy rules in a computer system, wherein:

said policy rules are operation management procedures in said computer system;

said maintenance of policy rules includes modification of the contents of at least one policy rule responsive to a configuration change within the computer system, said information processing apparatus comprises a processing unit and a policy rule storage unit that stores at least one policy rule for each component of said computer system; and said processing unit performs:

a receiving step, in which a notification is received related to one or more component of said computer system;

a determination step, in which, whether the type of the notification received in said receiving step is configuration change notification or other type including a performance failure notification, is determined;

a detection step, in which at least one component affected by the configuration change notification received in said receiving step and determined in said determination step, is detected; and a generation step, in which policy rules to be modified are listed by specifying the policy rules that are associated respectively with the components detected in said detection step from said policy rule storage unit, and a list of the specified policy rules is generated.

2. A policy rule management support method according to claim 1, wherein:

said processing unit performs further:

a first output step, in which said list of the policy rules generated in said generation step is outputted to an output device.

3. A policy rule management support method according to claim 1, wherein:

said receiving step receives said configuration change notification from an external system connected through a network and/or an input means that said information processing apparatus has.

4. A policy rule management support method according to claim 1, wherein:

said processing unit performs further:

a setting step, in which a caution flag for judging whether the operation management procedure of a policy rule concerned should be performed or not, is set for each of the policy rules specified in said generation step;

a notification receiving step, in which another notification other than said configuration change notification is received for each component of said computer system;

a judgment step, in which a policy rule corresponding to said another notification received for a component in said notification receiving step is specified from said policy rule storage unit and it is judged whether the specified policy rule is set with said caution flag; and a second output step, in which the specified policy rule is outputted to the output device when it is judged that the policy rule is set with the caution flag in said judgment step.

5. A policy rule management support method according to claim 1, wherein:

said processing unit performs further:

a setting step, in which a caution flag for judging whether the operation management procedure of a policy rule concerned should be performed or not, is set for each of the policy rules specified in said generation step;

a notification receiving step, in which another notification other than said configuration change notification is received for each component of said computer system;

a judgment step, in which a policy rule corresponding to said another notification received for a component in said notification receiving step is specified from said policy rule storage unit, and it is judged whether the specified policy rule is set with said caution flag; and a notification step, in which, when it is judged that the policy rule is set with the caution flag in said judgment step, an instruction of raising a trace output level of said computer system is notified to said computer system.

6. A policy rule management support method according to claim 1, wherein:

a prescribed work and an application program for executing said prescribed work are included in components of said computer system; and said prescribed work is a component affected by a configuration change of said application program.

7. A policy rule management support method according to claim 1, wherein:

an application program and middleware for providing various functions to said application program are included in components of said computer system; and said application program is a component affected by a configuration change of said middleware.

8. A policy rule management support method according to claim 1, wherein:

middleware for providing various functions to an application program and a server for executing said middleware are included in components of said computer system; and said middleware is a component affected by a configuration change of said server.

9. A policy rule management support apparatus that supports maintenance of policy rules in a computer system, wherein:

said policy rules are operation management procedures in said computer system; and said maintenance of policy rules includes modification of the contents of at least one policy rule responsive to a configuration change within the computer system, said policy rule management support apparatus comprises:

a policy rule storing means, which stores at least one policy rule for each component of said computer system;

a receiving means, which receives a notification related to one or more component of said computer system;

a determination means to determine whether the type of the notification received in said receiving step is configuration change notification or other type including a performance failure notification;

a detection means, which detect at least one components affected by a configuration change received by said receiving means and determined by the determination means; and a generation means, which lists policy rules from said policy rule storing means, to be modified by listing the policy rules that are associated respectively to components detected by said detection means, and generates a list of specified policy rules.

10. A computer memory embodying a policy rule management support program executed by an information processing apparatus for supporting maintenance of policy rules in a computer system, wherein:

said policy rules are operation management procedures in said computer system;

said maintenance of policy rules includes modification of the contents of at least one policy rule responsive to a configuration change within the computer system, said information processing apparatus comprises a processing unit and a policy rule storage unit that stores at least one policy rule for each component of said computer system; and said program makes said processing unit perform:

a receiving step, in which a notification is received related to one or more component of said computer system;

a determination step, in which, whether the type of the notification received in said receiving step is configuration change notification or other type including a performance failure notification, is determined;

a detection step, in which at least one component affected by the configuration change notification received in said receiving step and determined in said determination step, is detected; and a generation step, in which policy rules to be modified are listed by specifying the policy rules that are associated respectively with the components detected in said detection step from said policy rule storage unit, and a list of the specified policy rules is generated.

* * * * *